United States Patent Office 2,969,334
Patented Jan. 24, 1961

2,969,334

COMPOSITION COMPRISING DICHLOROMALEIC ANHYDRIDE AND AN EPOXY RESIN AND METHOD OF USING SAME

Robert Steckler, Russell, Ohio, assignor to Food Machinery and Chemical Corporation, New York, N.Y., a corporation of Delaware No Drawing. Filed Sept. 3, 1958, Ser. No. 758,677

13 Claims. (Cl. 260—2.5)

The invention relates to glycidyl polyether resin compositions comprising dichloromaleic anhydride, and to the cured resinous products thereof. This application is a continuation-in-part of Serial No. 505,851, filed May 3, 1955, now abandoned.

The use of polybasic acids and acid anhydrides as curing agents for glycidyl polyethers of dihydric phenols, commonly called epoxy resins or ethoxyline resins, is well known, and is discussed in U.S. Patent 2,324,483 to Castan. Usually anhydrides are the preferred curing agents, since their use avoids the formation of water as a by-product, as is the case with polybasic acids. However, because of the relatively high temperatures needed and the slow rate of the curing reaction with anhydrides, as compared with other available types of curing agents, particularly amines, anhydride curing agents have not in practice found wide applicability. On the other hand, the products of anhydride-cured epoxy resins offer, in general, certain advantages over amine-cured resins, particularly in the properties of color, color stability and acid-resistance.

It has now been discovered that when glycidyl polyethers of dihydric phenols are cured by reacting with dichloromaleic anhydride, the resins produced possess outstanding properties, and exhibit many advantages over those heretofore obtained through the use of more conventional curing agents. Dichloromaleic anhydride exhibits a unique behavior among curing agents for epoxy resins, with properties which show dichloromaleic anhydride to be unusually well suited for such use.

Epoxy resin compositions comprising dichloromaleic anhydride are applicable in fields where epoxy resins have heretofore exhibited severe deficiencies. Further, the compositions herein described possess improved and useful physical, electrical, mechanical and thermal properties, and may be used advantageously in a wide variety of applications, including casting, molding, laminating and coating, exhibiting a versatility that has not been achieved heretofore by epoxy resins.

An object of this invention is to provide epoxy resin compositions which offer the stability and inertness of anhydride-cured resins, combined with the rapid rate of cure of amine-cured resins. Another object is to provide epoxy resin compositions which do not produce a significant exothermic heat of reaction during the curing reaction. Another object is to provide epoxy resin compositions for which simple rapid curing procedures can be followed without regard to the size and shape of the article being manufactured. The resins provided herein exhibit equal hardness all the way through, a degree of cure that is remarkably uniform throughout, and toughness and impact resistance.

Despite the rapid rate of cure observed with dichloromaleic anhydride, there is virtually no exothermic heat of reaction accompanying the process of this invention. Most epoxy resin compositions, particularly those containing amine catalysts, are characterized by high exotherms. The rapid curing time of amino-cured castings generally does not allow dissipation of their high heats of reaction, and results in overheating and charring. The size of cast articles is thereby limited, and large castings usually require special procedures such as a two-stage curing process. Special handling is required also in the case of laminated articles, since the heat generated during the amine curing reaction has been known to crack laminates in the molds. Nevertheless, amines rather than anhydrides have usually been used in these applications, since the latter have been considered to react too slowly, and at too high temperatures, to be commercially useful.

In addition to these advantages, epoxy resins cured with dichloromaleic anhydride show outstanding dielectric properties, such that they are ideally suited to the "potting" of electrical components—a technique used to protect electronic assemblies from mechanical and thermal stresses and to minimize energy losses. Potting resins must have not only the appropriate mechanical, thermal and dielectric properties, but also a relatively low curing temperature. The resins of this invention are shown to have a power factor which is of a superior order, and which is relatively unaffected by temperature changes. The dielectric breakdown strength and the arc resistance are also in the appropriate favorable range for this application. These qualities, combined with those of high heat stability, tensile strength, toughness and flame retardancy, make these resin compositions ideal for potting applications, offering advantages, both in degree and in kind, over compositions heretofore available.

Another unexpected property of the compositions of this invention is the ability to cure to rigid foamed products. These foamed resins preserve the superior properties of unfoamed resins, yet have a considerably lower density. The formation of stable foams requires a delicate balance between the rate of cure of the resin and the rate of emission of gas by a foaming agent. The process requires that the curing reaction occur simultaneously with and at the same temperature as the liberation of the gas. Too rapid a cure forms at best a partly foamed resin, and too slow a cure, as observed with maleic, chloromaleic and other anhydrides, allows all the gas to be liberated before the resin starts to set up. Ideally, the curing reaction should start as the first gas bubbles are formed, and continue throughout the evolution, thereby achieving maximum foaming efficiency. Such is the case with dichloromaleic anhydride. And, since the dichloromaleic anhydride/epoxy reaction is negligibly exothermic, large batches of foamed resin can be produced at once.

This resin composition is not only ideally suited for the applications already described, but can also be effectively used from solution to produce laminates and films. Solutions of epoxy resins and dichloromaleic anhydride exhibit an extremely long shelf life; for example, a 50% solids acetone solution is stable for over 8 months at room temperature. Yet films deposited from such an aged solution cure to a tack-free film in ten to fifteen minutes, and these films show increased solvent and acid resistance compared with epoxy resin films cured with many other agents. Dichloromaleic anhydride is unique in this application, since other anhydrides cure far too slowly at room temperature, or else settle out of the film before reacting due to incompatibility with or limited solubility in the resin. As compared with amine-cured epoxy resins, whose curing rates are sufficiently rapid for use in paint films, the dichloromaleic anhydride-cured products exhibit advantages of color and color stability, and enhanced solvent and chemical resistance.

To produce laminated articles, substances such as paper, glass cloth or other fabrics are coated or impregnated with solutions of dichloromaleic anhydride and epoxy resins in ketone solvents. As the solvent evaporates, incipient cure or gelation occurs. These tack-free materials may be rolled, stored, stacked for lamination and cured as desired. They are unusually easy to handle, avoid the sticky sheets and runny resins achieved with other anhydrides, and ensure an even distribution of resin throughout the laminate. The shelf life of these impregnated sheets is unexpectedly good, and even after several months storage they may be bonded into laminates.

In addition to the modifications already described, for certain applications of these resins it may be desirable to add other agents, such as extenders, fillers, pigments, reinforcing or thinning agents, unsaturated or saturated oils, plasticizers, or other substances with special utility.

The epoxy resin components of the present invention, described above as glycidyl polyethers of dihydric phenols, may be chosen from the commercially available glycidyl polyethers having an average of between 1 and 2 epoxy groups

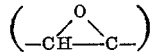

per molecule. They are obtainable by reacting an epihalogenhydrin with a dihydric phenol in alkaline medium, the reaction product generally being a complex mixture of glycidyl polyethers. The preparation of these resins is described extensively in the literature. For example, U.S. Patent 2,324,483 and 2,444,333 to Castan, and U.S. Patents 2,682,514 to Newey and 2,682,515 to Naps, describe in detail the preparation of properties of these resins. Particularly, Newey Patent 2,682,514 describes the preparation of a number of reaction products of bis-(4-hydroxyphenyl)-2,2-propane (bisphenol-A) and epichlorohydrin which are useful herein, covering a range of molecular weights.

The principal product of the reaction between epichlorohydrin and bisphenol-A may be represented by the formula:

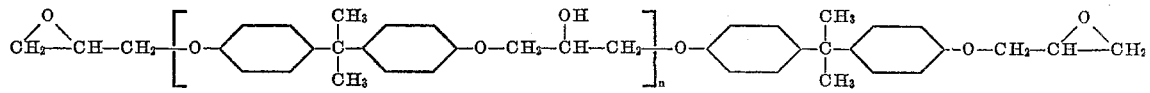

where $n$ is an integer of the series 0, 1, 2, 3 ... up to about 7. The actually obtained glycidyl polyether is a mixture of compounds, having an average of between one and two epoxy groups per resin molecule, some of the terminal glycidyl radicals being in hydrated form. These products are commercially available. They may be obtained from the Shell Chemical Corporation under the trade name Epon, the Bakelite Company under the name Bakelite C-8 resin, the Borden Company under the name Epiphen, and the Ciba Company under the name Araldite.

These resins may be characterized by their average molecular weight, epoxide equivalent weight, and melting or softening point. The average molecular weight is related to the number of epoxy groups per resin molecule by the epoxide equivalent weight, defined as the number of grams of resin containing one gram equivalent of epoxide. Those resins having an epoxide equivalent weight below about 275 are usually fluid at room temperature, those with higher epoxide equivalents are generally solid.

Curing these resins to hard, high molecular-weight solids involves, as the principal reaction, cross-linking through the reactive epoxy groups, although the hydroxy groups may also react. The nature of the curing agent, and the conditions under which curing is effected, contribute substantially to the properties of the products. Polycarboxylic anhydrides as cross-linking agents enter into the resin molecules as diester bridges, with possibly some polyester formation contributing to the curing process. The mechanism of the curing reaction not yet been fully clarified.

A wide range of epoxy resins may be used in the various embodiments of our invention, with epoxide equivalents ranging from about 175 to 600, and corresponding melting points of 0° C. to about 85° C. As the melting points (and epoxide equivalents) increase within this range the pot lives of the mixtures are shortened. In general, resins having higher epoxide equivalents require a lower weight ratio of curing agent, since the initial molecular weight of the base resin is higher.

Lower melting resins, melting below about 45° C., are usually preferred, to facilitate dissolving the dichloromaleic anhydride in the base resin at temperatures below which incipient cure or gelation does not occur too rapidly for the necessary precure manipulations. For resins in this range, with epoxide equivalents of about 175 to 350, corresponding amounts of dichloromaleic anhydride ranging from about 5 to 55 parts per 100 parts of base resin are recommended. These proportions are varied depending not only on the epoxide equivalent but also on the use. For example, less dichloromaleic anhydride is usually used in laminating applications than in castings or films, to slow down the reaction rate and to produce a more flexible product.

Relatively low molecular weight resins, such as those melting between about 8° C. and 28° C., with corresponding epoxide equivalents ranging from about 190 to 300, when cured with from about 35 to 42 parts of dicholormaleic anhydride per 100 parts base resin, have produced resins having exceptional thermal, electrical and mechanical properties.

It has been found that, for each range of epoxide equivalents, there is an optimum amount of dichloromaleic anhydride, below or above which the exceptional properties of the cured resins, as reflected in their heat distortion points, power factors, etc., are diminished. Conversely, the extent of cure of a given resin under varying conditions is measurable in terms of these properties.

For example, the heat distortion points obtained on curing a given epoxy resin increase to a maximum value as the amount of dichloromaleic anhydride in the system increases, after which maximum value further increase in the proportion of dichloromaleic anhydride results in a decrease in the heat distortion points. Optimum temperature characteristics and mechanical and electrical properties are obtained in the range of this optimum ratio of curing agent to resin.

In a preferred process for manufacturing the resins of this invention, the desired amount of dichloromaleic anhydride is dissolved in the base resin at about 60–80° C. Below about 60° C. recrystallization and separation of the anhydride occurs, and above about 90–95° C. pot life decreases and gelation may occur rapidly. The exact conditions employed depend on the time needed to conduct pre-cure manipulations, such as pouring into a mold, casting into films, spreading in laminate or adhesive applications, etc.

Curing is effected in times ranging from about 15 minutes to 48 hours, at corresponding temperatures of from about 175° C. to 20° C. The curing process is substantially complete in less than 1 hour at 120° C. Again, the conditions chosen depend on the application, environment, additives, etc. The use of pressure is sometimes advantageous in such applications as laminating and adhesion, but is not an essential condition for the curing reaction.

For most uses the pot lives of the compositions are adequate. Should it be desired, for special applications, to extend the pot life, we have discovered that this may be achieved as follows: Instead of dissolving the curing agent in the resin at elevated temperatures, the requisite amount of solid pulverized dichloromaleic anhydride is mixed into the uncured resin at room temperature, or at the lowest temperature at which the resin is fluid. The dispersed curing agent dissolves into the resin during the elevated temperature curing cycle. The cold dichloromaleic anhydride/epoxy resin slurry has a considerably longer pot life than does the heated resin containing dissolved anhydride.

This method of prolonging the pot life is especially useful in the preparation of foamed dichloromaleic anhydride/epoxy resins, where it is necessary to avoid incipient cure before the gas bubbles are liberated. Thus, powdered dichloromaleic anhydride is dispersed in the epoxy resin by rapid stirring or milling at a temperature below that at which the anhydride dissolves in the resin or curing occurs, preferably at the lowest temperature at which the resin flows. The appropriate amount of foaming agent and a few drops of surfactant are added, and rapid curing, such as at 150° C. for 15 minutes, results in a stable low-density foam.

Storage stabilities are also improved by dissolving both the epoxy resin and the dichloromaleic anhydride in an appropriate solvent. Stable solutions in ketone solvents containing 25 to 85% of nonvolatile solids have been prepared, with a preferred range of about 50 to 75%. Acetone solutions containing 50% solids have shown a shelf life of over 8 months. Deposits from such solutions cure rapidly after evaporation of the solvent, and thus are well suited for laminating and coating purposes.

In forming laminated articles and films from such solutions, a composition range of about 5–55 parts of dichloromaleic anhydride to 100 parts of base resin is operable, with a preferred range of 10–45 parts of dichloromaleic anhydride. Below about 5 parts of anhydride the strength of the product is seriously affected, and above about 55 parts the undesirable factor of residual acidity in the laminate appears. Usually a base resin having an epoxide equivalent of less than about 300 gives best results in these applications.

Less dichloromaleic anhydride is generally used in laminates than in films, in order to inhibit premature cure, which would inhibit fusion during the laminating process.

The practice of the invention is illustrated by the following examples, wherein parts are by weight unless otherwise indicated.

EXAMPLE 1

Various epoxy resins manufactured by the Shell Chemical Company, under the trade name "Epon" and the Bakelite Company under the name "Bakelite C-8 resin" were cured with dichloromaleic anhydride, and their physical properties determined. These resins are the reaction product of epichlorohydrin and bis-(4-hydroxyphenyl)-2,2-propane, and are characterized commercially by their melting points and epoxide equivalents, as shown in Table 1 below.

Epoxy resin compositions containing various proportions of dichloromaleic anhydride were prepared by heating 100 parts of base epoxy resin to 70° C. and stirring in the requisite amount of powdered dichloromaleic anhydride until completely dissolved. The solutions were poured into silicone-coated sheet metal molds, approximately 5½ x ⅝ x ⅝ inches in dimensions, and placed in an oven at 125° C. After 18 hours, the cured specimens were machined to size and the heat distoration points were determined according to ASTM test method D–648. This test is conducted by subjecting a 5" x ½" x ½" test bar, suspended near both ends, to a pressure of 264 p.s.i. in the center, raising the temperature 2° C. per minute. The temperature at which the test bar is bent 0.01" is the heat distortion point at 264 p.s.i. Table 1 below shows heat distortion data obtained in this way. The abbreviation DCMA refers to dichloromaleic anhydride.

*Table 1.—Heat distortion points of cured epoxy resins*

| Base Epoxy Resin | | | Parts DCMA/ 100 parts base resin | Heat Distortion point, ° C. |
|---|---|---|---|---|
| Trade Name | Melting point, ° C. | Epoxide equivalent | | |
| Bakelite Br-18774 | below 10 | 179–194 | 34 | 95. |
| Bakelite Br-18794 | below 10 | 185–200 | 34 | 113. |
| Epon 828 | 8–12 | 190–210 | 34 | 108. |
| Do | 8–12 | 190–210 | 51 | 114. |
| Epon 834 | 20–28 | 225–290 | 26 | 67. |
| Do | 20–28 | 225–290 | 31 | 86. |
| Do | 20–28 | 225–290 | 34 | 105. |
| Do | 20–28 | 225–290 | 38 | 119. |
| Do | 20–28 | 225–290 | 43 | 118. |
| Do | 20–28 | 225–290 | 47 | 111. |
| Do | 20–28 | 225–290 | 51 | 101. |
| Do | 20–28 | 225–290 | 59 | 89. |
| Epon 864 | 40–45 | 300–375 | 51 | 66. |
| Epon 1001 | 64–76 | 450–525 | 51 | below 66. |

Graphical study of the effect of the anhydride/resin ratio on the heat distortion points shows, for resins having epoxide equivalents in the range of 190–220 and melting over the range 8–28° C., maximum heat stabilities at compositions containing about 35–42 parts of dichloromaleic anhydride to 100 parts resin.

EXAMPLE 2

Mechanical properties of cast bars prepared according to the procedure of Example 1 and containing 38 parts of dichloromaleic anhydride to 100 parts of Epon 834 resin, having an epoxide equivalent of 225–290 and a melting point of 20–28° C., were determined according to standard ASTM tests. The results listed in Table 2 show that these resins have excellent strength and hardness characteristics.

*Table 2.—Mechanical properties of resins cured with dichloromaleic anhydride*

| Property | Test Method | Value |
|---|---|---|
| Tensile strength | ASTM D-651-48 | 12,750 p.s.i. |
| Compressive strength | ASTM D-695-49T | 15,000–15,700 p.s.i. |
| Flexural strength | ASTM D-790-49T | 17,060 p.s.i. |
| Modulus of Elasticity | ASTM D-790-49T | 379,000 p.s.i. |
| Hardness | Shore Durometer | 85, D scale. |

Toughness and impact resistance were demonstrated qualitatively in a cold brittleness test. Cured discs, approximately ¼" thick and 3" in diameter, were chilled to −25° C. and dropped on a hardwood floor from a height of 8 feet. The chilled discs survived these impacts repeatedly.

EXAMPLE 3

Electrical properties of cast discs prepared according to the procedure of Example 1 were determined. Table 3 below compares power factor data for optimum formulations of several curing agents. Power factor is defined as the ratio of true power to apparent power, expressed as percent. It it seen that the values for the dichloromaleic anhydride-cured resin containing 38 parts dichloromaleic anhydride and 100 parts Epon 834 are not only lower than those reported for two other curing agents which have been particularly recommended for use in potting resins, but also that the dichloromaleic anhydride-cured resin shows a very low temperature coefficient.

*Table 3.—Power factor data*

| Curing agent | Power Factor at 60 cycles | |
|---|---|---|
| | 25° C. | 150° C. |
| | Percent | Percent |
| dichloromaleic anhydride | 0.17 | 2.6 |
| m-phenylene diamine | 0.5 | 5 |
| phthalic anhydride | 0.7 | 36 |

EXAMPLE 4

To evaluate dielectric strengths, cured discs prepared from 38 parts of dichloromaleic anhydride and 100 parts of Epon 834 resin, having an epoxide equivalent of 225–290, were tested according to ASTM test D–149–44. From disc thicknesses of 21.5 and 18.5 mils, dielectric strengths of 660 and 700 v./mil were obtained. The 21.5 mil disc withstood 14,000 v. for 1 minute, but failed at 15,000 v. in 35 seconds. The 18.5 mil disc withstood 13,000 v. for 1 minute, but failed at 14,000 v. in 10 seconds. These values are in an excellent range for electrical and electronic applications.

EXAMPLE 5

To verify flame retardancy, test bars were prepared from epoxy resin compositions cured with 20 parts and 38 parts of dichloromaleic anhydride to 100 parts of resin, and bars cured with corresponding amounts of maleic anhydride were prepared for comparative purposes. One end of each bar was ignited in the flame of a Meeker burner. After ignition, the test bar was removed and the burning characteristics observed. The compositions containing maleic anhydride continued to burn vigorously in the air. Compositions containing dichloromaleic anyhdride were self-extinguishing when removed from the flame. These observations were confirmed by repeated tests. Dichloromaleic anhydride-cured compositions also passed ASTM test D–568–43, method B, which is the benzol drop method for flammability of plastics.

EXAMPLE 6

As a method for prolonging the pot life of compositions containing dichloromaleic anhydride, 30 parts of dichloromaleic anhydride, pulverized to 60 mesh, was mixed at room temperature with 100 parts of Epon 828 resin having an epoxide equivalent of 190–210 and a melting point of 8–12° C., by grinding 2 passes on a 3-roll paint mill. The resulting opaque dispersion had a pot life of about 9 hours, as compared with ½–1 hour for compositions prepared by dissolving dichloromaleic anhydride in the base resin at elevated temperatures. When deaerated in vacuo, cast into aluminum dishes, and cured for 4 hours at 80° C., clear tough discs were formed from this dispersion, having a hardness value of 85 on the Shore D scale.

EXAMPLE 7

Foamed epoxy resins were prepared as follows: 38 parts of pulverized dichloromaleic anhydride was dissolved with rapid stirring in 100 parts of Epon 834 resin, preheated to 70° C. and containing 4 drops of sorbitan monolaurate. Ten parts of Celogen [p,p'-oxy bis(benzene sulfonyl hydrazide)] was added as foaming agent, and the hot mix was placed in an oven at 145° C. After 15 minutes the foaming-curing reaction was complete, and a stable rigid foam having a density of 8.4 lbs./cu. ft. was formed.

EXAMPLE 8

A foamed epoxy resin was also produced by first dispersing 38 parts of dichloromaleic anhydride, at room temperature, in a resin having an epoxide equivalent of 190–290, a mixture of equal parts of Epon 828 and Epon 834. Curing as in Example 7 produced a rigid foam having a density of 9.7 lbs./cu. ft. Replacing the dichloromaleic anhydride with an equivalent amount of maleic anhydride (MA) produced no foam. However, replacing only part of the dichloromaleic anhydride with maleic anhydride was found to produce an effective foam. Results for various experimental formulations are summarized in Table 4.

*Table 4.—Foamed epoxy resins*

| Parts/100 parts epoxy resin | | | | Conditions | | | Foam Density, lbs./cu. ft. |
|---|---|---|---|---|---|---|---|
| DCMA | MA | Celogen | Sorbitan Monolaurate, drops | Mixing temp., °C. | Curing time, min. | Curing temp., °C. | |
| 38 | ---- | 5 | -------- | 70 | 15 | 175 | 51 |
| 38 | ---- | 5 | -------- | 70 | 15 | 145 | 30.9 |
| 38 | ---- | 10 | -------- | 70 | 15 | 145 | 16.3 |
| 38 | ---- | 10 | -------- | 70 | 15 | 175 | 14.2 |
| 38 | ---- | 10 | 4 | 70 | 15 | 145 | 8.4 |
| 38 | ---- | 10 | 4 | 25 | 20 | 160 | 9.7 |
| 38 | ---- | 10 | 4 | 25 | 30 | 130 | 14.9 |
| 19 | 11.5 | 10 | 4 | 25 | 20 | 160 | 10.9 |
| ---- | 23 | 10 | 4 | 25 | 20 | 160 | no foam |

EXAMPLE 9

A typical reinforced epoxy resin laminate was prepared by dissolving 38 parts of dichloromaleic anhydride in 264 parts of acetone, and adding 100 parts of Epon 828. A clear solution resulted, which had a shelf life of over 8 months at room temperature. Fiber glass cloth was impregnated with this solution, and after about 15 minutes at room temperature formed non-tacky, non-blocking sheets which could be stored for later fabrication and molding. On lamination, the correct number of plies for the desired thickness were placed in a heated platen press between sheets of siliconized aluminum foil. Curing for 50 minutes at 150° C. and 100 p.s.i. pressure produced a strong laminate with a resin content of 35%, showing a flexural strength of 50,700 p.s.i. and a modulus of elasticity of 2,200,000 p.s.i.

Glass reinforced dichloromaleic anhydride/epoxy laminates were also prepared without the addition of a solvent, by dispersing dichloromaleic anhydride directly in the epoxy resin and using a wet lay-up technique. The pot life of these solvent-free dispersions was limited to about 8 hours.

EXAMPLE 10

A series of gel tests was carried out to compare the relative rates of cure of epoxy resin compositions containing dichloromaleic anhydride with those containing maleic anhydride, and also to compare these rates with those of another anhydride system. Using optimum ratios of the subject anhydrides and the resins shown, the following gelation behavior was observed:

*Table 5.—Gel times of anhydrides with epoxy resins*

| Base epoxy resin | Anhydride | Gel time at 95° C. | Rate increase over unchlorinated analog |
|---|---|---|---|
| Epon 834 | Maleic | 4.6 hours | |
| Do | Dichloromaleic | 5 minutes | 54 x. |
| Do | Phthalic | 14.8 hours | |
| Do | Tetrachlorophthalic | 4.3 hours | 3.5 x. |
| Epon 828 | Maleic | 13.3 hours | |
| Do | Dichloromaleic | 40 minutes | 20 x. |
| Do | Phthalic | over 21.3 hrs | |
| Do | Dichlorophthalic | 3.5 hours | over 6 x. |
| Do | Tetrachlorophthalic | 7.3 hours | over 3 x. |

The last column of Table 5 tabulates the approximate increases in rates of gelation shown by the chlorine-containing anhydrides over their unchlorinated analogs. These results show conclusively that neither the overall rates of cure of phthalic anhydride and its chlorinated derivatives, nor the magnitudes of the increases in gel times shown by the chlorinated phthalic anhydrides, are comparable with those observed for dichloromaleic anhydride as compared with maleic anhydride. In considering further the phthalic and chlorinated phthalic anhydrides, it is seen also that there is no consistent relation between the degree of chlorine substitution and the rate of gelation, since the reaction rate of tetrachlorophthalic anhydride is less than half that of dichlorophthalic anhydride.

From the foregoing description and illustrative examples it is apparent that the novel process of this invention is susceptible to numerous modifications and variations within the scope of the disclosure, and it is intended to include such modifications and variations in the following claims.

That which is claimed is:

1. A composition of matter comprising the reaction product of dichloromaleic anhydride and a glycidyl polyether of a dihydric phenol having an average of between one and two 1,2-epoxy groups per molecule.

2. The solid resinous product obtained by curing a composition comprising dichloromaleic anhydride and a glycidyl polyether of a dihydric phenol having an average of between one and two 1,2-epoxy groups per molecule.

3. The solid resinous product obtained by curing a composition comprising a glycidyl polyether of a dihydric phenol having an average of between one and two 1,2-epoxy groups per molecule and a softening point below about 45° C., and about 5–55 parts dichloromaleic anhydride per 100 parts epoxy resin.

4. The solid resinous product obtained by curing a composition comprising a glycidyl polyether of a dihydric phenol having an average of between one and two 1,2-epoxy groups per molecule and a softening point between about 8° and 28° C., and about 25–42 parts dichloromaleic anhydride per 100 parts epoxy resin.

5. A composition capable of conversion to water-insoluble, infusible products comprising dichloromaleic anhydride and a glycidyl polyether of a dihydric phenol having an average of between one and two 1,2-epoxy groups per molecule and a softening point below about 45° C., dissolved in a volatile solvent for said composition, said composition comprising about 25–85% by weight of said solution.

6. A composition capable of conversion to water-insoluble, infusible products comprising a glycidyl polyether of a dihydric phenol having an average of between one and two 1,2-epoxy groups per molecule and a softening point between about 8° and 28° C., and about 10–45 parts dichloromaleic anhydride per 100 parts epoxy resin, dissolved in a volatile solvent for said composition, said composition comprising about 50–75% by weight of said solution.

7. A method of producing a resinous composition comprising dichloromaleic anhydride and a glycidyl polyether of a dihydric phenol having an average of between one and two 1,2-epoxy groups per molecule, comprising combining dichloromaleic anhydride and the epoxy resin, and curing said combination to form a resinous product.

8. A method of producing a solid resinous product from a composition comprising dichloromaleic anhydride and a glycidyl polyether of a dihydric phenol having an average of between one and two 1,2-epoxy groups per molecule, comprising dissolving dichloromaleic anhydride in the epoxy resin at a temperature of about 60–80° C., and curing said solution to a solid resinous product.

9. A method of producing a foamed resinous product from a composition comprising dichloromaleic anhydride and a glycidyl polyether of a dihydric phenol having an average of between one and two 1,2-epoxy groups per molecule comprising: pulverizing the dichloromaleic anhydride, dispersing the pulverized dichloromaleic anhydride in the epoxy resin at a temperature below the curing temperature of the composition, adding a foaming agent, and curing the composition at a temperature at which said foaming agent continuously liberates gas bubbles.

10. The foamed resinous product produced by the method of claim 9.

11. A method of producing a resinous coating comprising: dissolving a composition comprising 100 parts of an epoxy resin having an average of between one and two 1,2-epoxy groups per molecule and a softening point below about 45° C., and 5–55 parts of dichloromaleic anhydride, in a volatile solvent for said composition, said composition comprising 25–85% by weight of said solution; applying said solution to a substrate for said coating; evaporating said volatile solvent; and curing said composition to a solid resinous product.

12. A resin coated substrate prepared by the method of claim 11.

13. A method of prolonging the pot life of a composition comprising dichloromaleic anhydride and a glycidyl polyether of a dihydric phenol having an average of between one and two 1,2-epoxy groups per molecule comprising: pulverizing the dichloromaleic anhydride; dispersing the pulverized dichloromaleic anhydride in the epoxy resin at a temperature below that at which said anhydride is soluble in said resin; and maintaining the dispersion at a temperature below that at which said anhydride is soluble in said resin.

References Cited in the file of this patent

UNITED STATES PATENTS

| | | |
|---|---|---|
| 2,739,134 | Parry et al. | Mar. 20, 1956 |
| 2,768,153 | Shokal | Oct. 23, 1956 |